United States Patent [19]
Toups

[11] Patent Number: 5,976,062
[45] Date of Patent: Nov. 2, 1999

[54] INCLIMETRIC RESISTANCE SLIDING SLEEVE EXERCISE DEVICE

[76] Inventor: Lanny J. Toups, 338 Meadowcreek Dr., Duncanville, Tex. 75137

[21] Appl. No.: 09/134,987

[22] Filed: Aug. 17, 1998

[51] Int. Cl.$^6$ .............................. A63B 21/00; F16H 27/02
[52] U.S. Cl. ............................ 482/99; 482/100; 482/101; 482/135; 482/137; 74/89.15
[58] Field of Search ......................... 482/92–94, 97–103, 482/133, 135, 136–138, 112, 113, 129, 130; 74/89.15

[56] References Cited

U.S. PATENT DOCUMENTS

| | | | |
|---|---|---|---|
| 3,599,499 | 8/1971 | Steiner | 74/89.15 |
| 5,622,078 | 4/1997 | Mattson | 74/89.15 |
| 5,669,861 | 9/1997 | Toups | 482/98 |

*Primary Examiner*—John Mulcahy
*Attorney, Agent, or Firm*—John E. Vandigriff

[57] ABSTRACT

The invention is an exercise device which creates a controlled and infinitely variable resistance profile using a pair of rods that are wrapped about a common axis with a varying pitch. A slide unit is attached to the rods with rollers. When the slide unit is moved in a linear motion, the movement of the rollers on the rods causes the rods, and a shaft on which they are mounted to rotate. In one embodiment, the rotation of the shaft is used to move one or more units of a set of stacked weights. In a second embodiment, a rotation motion of the shaft on which the rods are mounted, causes a linear motion to the slide unit which is attached to a set of stacked weighs.

13 Claims, 7 Drawing Sheets

5,976,062

INCLIMETRIC RESISTANCE SLIDING SLEEVE EXERCISE DEVICE

FIELD OF THE INVENTION

This invention relates to exercise devices, and more particularly to a sliding sleeve inclimetric resistance exercise device.

CROSS-REFERENCE

U.S. Pat. No. 5,669,861, titled, "Incline Resistance Weight Unit for Exercise Machine.

BACKGROUND OF THE INVENTION

Exercise machines generally have as a weight element a plurality of weights that are stacked with a pair of parallel bars extending through the weights to keep them stacked and to provide a vertical path for the weights. A third rod extends down through the stacked weights and has a row of holes extending through the rods corresponding to holes in the weights. By inserting a pin into a hole in a weight and through to a corresponding pin in the third rod, all weights above the weight into which the pin is inserted will be the weights that are to be lifted. The weights are connected by cables and pulleys to one of several handles or pedals that are pushed with the feet or grasped by the hands to lift the weights. Machines utilizing such weight apparatus are heavy and only the exact amount of weight in the stack of weights is available for use.

SUMMARY OF THE INVENTION

The invention is an exercise device which creates a controlled and infinitely variable resistance profile much the same as the Incline Resistance Weight Unit described in U.S. Pat. No. 5,669,861. This unit, however, creates this infinitely variable resistance using a pair of rods that are wrapped about a common axis with a varying pitch. A slide unit is attached to the rods with rollers. When the slide unit is moved in a linear motion, the movement of the rollers on the rods causes the rod, and a shaft on which they are mounted to rotate. In one embodiment, the rotation of the shaft is used to move one or more units of a set of stacked weights. In a second embodiment, a rotation motion of the shaft on which the rods are mounted, cause a linear motion to the slide unit which is attached to a set of stacked weighs. The advantage of this concept over the aforementioned patent is that usage of this resistance medium creates an exercise device that can create an infinitely variable resistance profile as described using the same principles of physics that apply to U.S. Pat. No. 5,669,861. In the present invention, the inclimetric resistance device is simpler to construct than that in U.S. Pat. No. 5,669,861, and provides the capability to change the resistance profile to exercise multiple muscle groups using the same resistance device.

DESCRIPTION OF A PREFERRED EMBODIMENT

Figure 1:
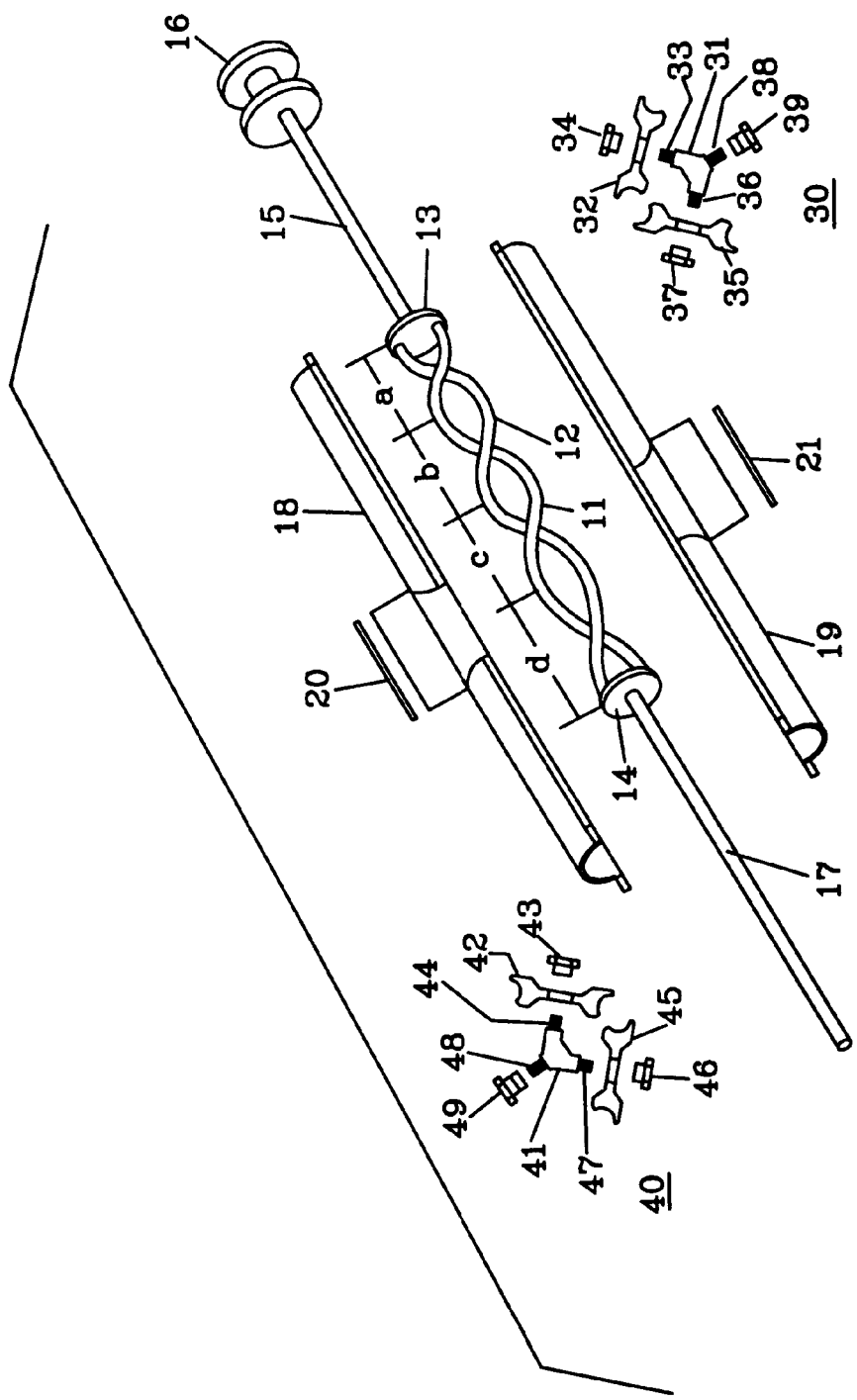
FIG. 1 is an exploded view of the sliding sleeve inclimetric resistance device.

FIG. 1 is an exploded view of the sliding sleeve inclimetric resistance device 10. Device 10 has a pair of rods 11 and 12 that are coiled around a common axis. Rods 11 and 12 are coiled such that there is an increasing incline from a first end, for example the end of rods 11 and 12 that are secured to disk 13 to a second end where rods 11 and 12 are secured to disk 14. In viewing the incline of rods 11 and 12, it may be observed that the sections a, b, c and d show the increasing incline of coiled rods 11 and 12. Sections a and b have a lesser incline than the sections c and d. The incline of rods 11 and 12 increase in relation to the longitudinal axis of assembly 10. The longitudinal axis is along rods 15 and 17.

Coiled rods 11 and 12 are attached to mounting disks 13 and 14. Disk 14 is attached to shaft 17 and disk 13 is attached to shaft 15. Pulley 16 is attached to shaft 15. Coiled rods 11 and 12 have an axis common with shafts 15 and 17.

Device 10 has a housing made up of a slide unit having two sides 18 and 19 which enclose coiled rods 11 and 12, a portion of shafts 15 and 17, and roller units 30 and 40. Roller units 30 and 40 attach, one each, to coil rods 11 and 12.

Roller unit 30 has two rollers 32 and 35 which attached to and are secured to mount 31 by screw 33 and nut 34, and screw 36 and nut 37, respectively. When assembled, roller unit 30 is attached to plate 21 by screw 38 and nut 39. Similarly, roller unit 40 has two rollers 42 and 45 which attached to and are secured to mount 41 by screw 44 and nut 43, and screw 47 and nut 46, respectively. When assembled, roller unit 40 is attached to plate 20 by screw 48 and nut 49.

Figure 2:
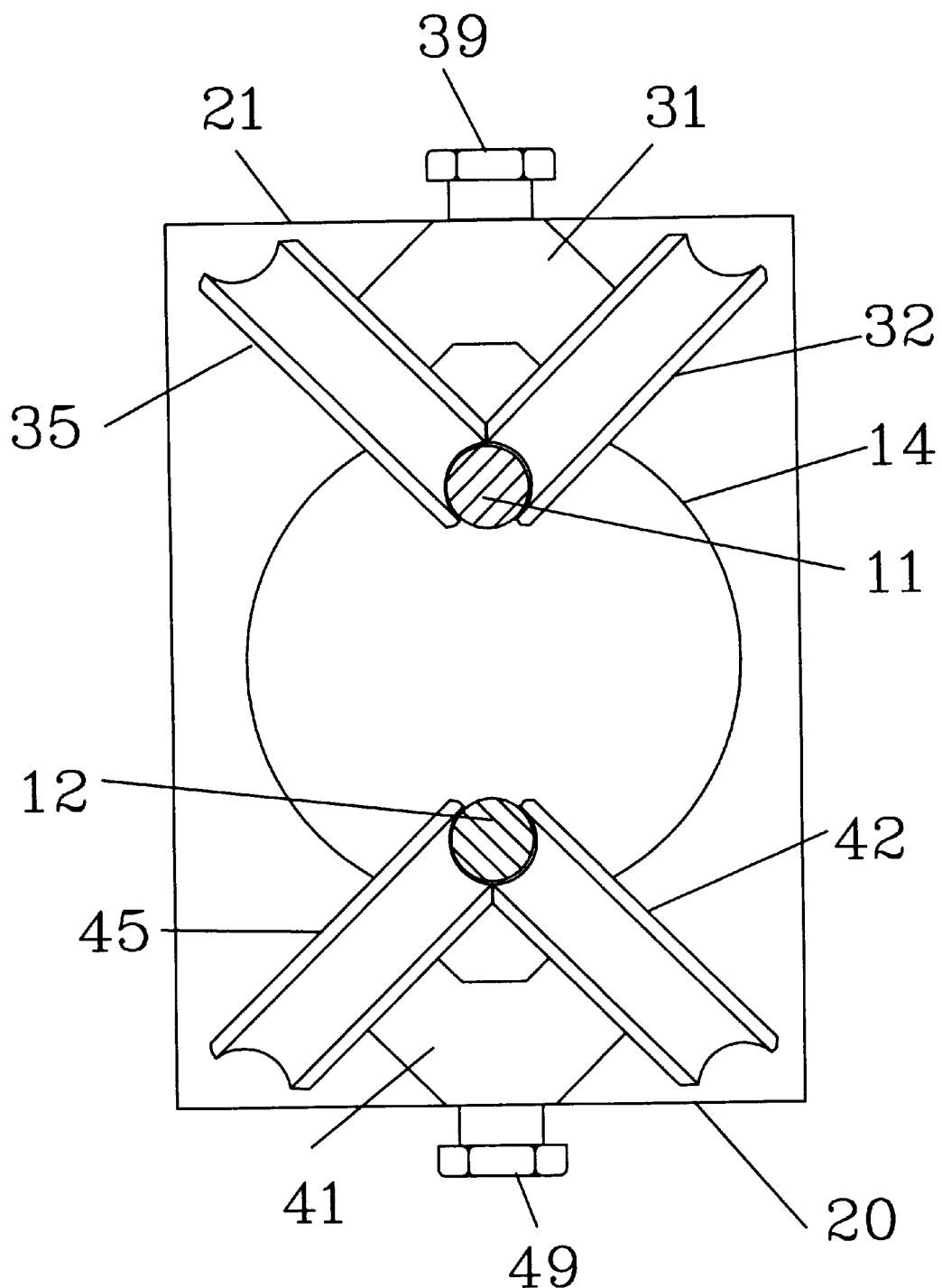
FIG. 2 is a cross-sectional view showing the rollers on the incline rods.

FIG. 2 is a cross-sectional view showing roller assemblies 30 and 40, mounted on coiled rods 11 and 12, and mounted on plates 20 and 21 in housing 18, 19. Rollers 32 and 35 are positioned on mount 31 so that rollers 32 and 35 partially encircle rod 11. Similarly, rollers 42 and 45, mounted on mount 41, partially encircle rod 12. Roller assemblies 30 and 40 can rotate in the same plane as plates 20 and 21.

Figure 3:
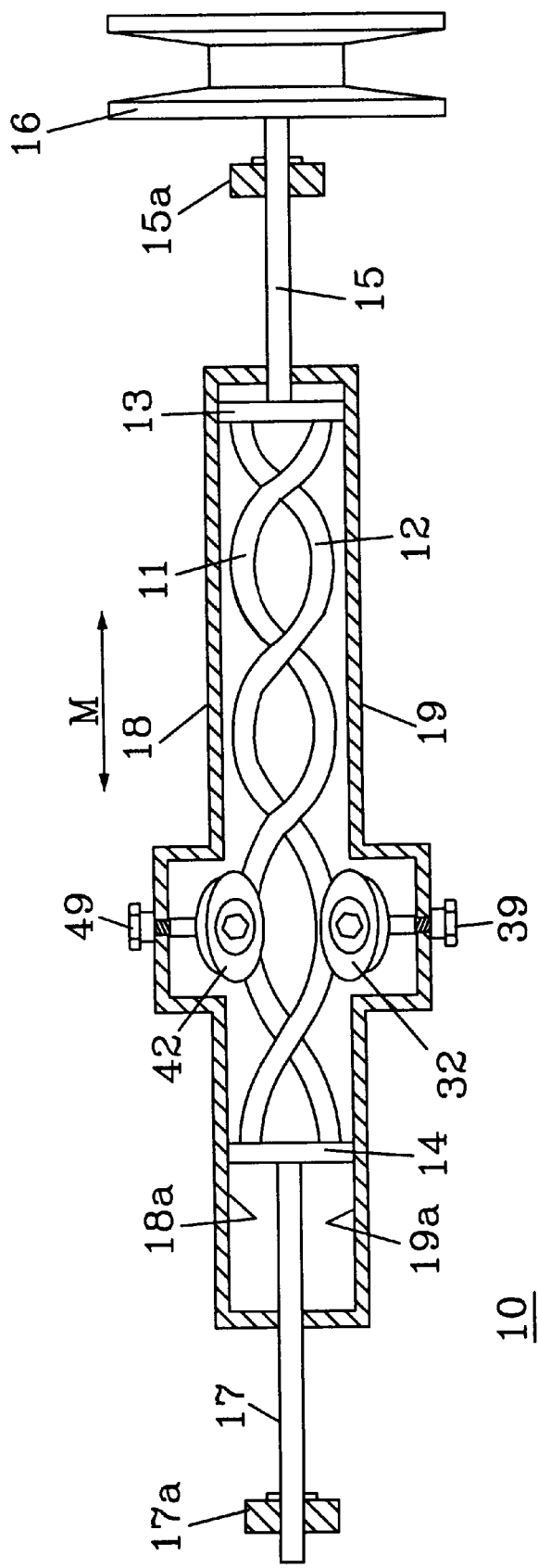
FIG. 3 shows a first embodiment of the sliding sleeve inclimetric resistance device where a linear motion of the sleeve causes a rotary or rotational motion.

FIG. 3 shows an assembled sliding sleeve inclimetric resistance device 10. Device 10 includes slide housing 18, 19 enclosing coil rods 11 and 12. Coil rods 11 and 12 are movably mounted in housing 18,19 by disks 13 and 14 which are free to slide on the inner walls 18a and 19a. There are two possible modes of operation of device 10. With shaft 17 15 rotatably secured in frame 17a, and shaft rotatably secured in frame 15a, pulley 16, shaft 15, coil rods 11 and 12 and shaft 17 will rotate. By moving sleeve housing 18,19 in either direction as indicated by arrow M, coils 11 and 12, shafts 15 and 17 and pulley 16 will be rotated. The interaction between the movement of rollers 32 and 42, along with pairs of rollers 32,35 and 42,45, not illustrated in FIG. 3 cause coils 11 and 12 to rotate. This rotation causes shafts 15 and 17 and pulley 16 to rotate. This rotational motion caused by the linear motion of sleeve housing 18,19 can be utilized in an exercise apparatus. In the configuration of FIG. 3, the resistance increases as the sleeve is moved from left to right. This is true even through the slope of the coiled rods 11 and 12 is decreasing in relation to the longitudinal axis of the device moving from a to d (FIG. 1).

Figure 4:
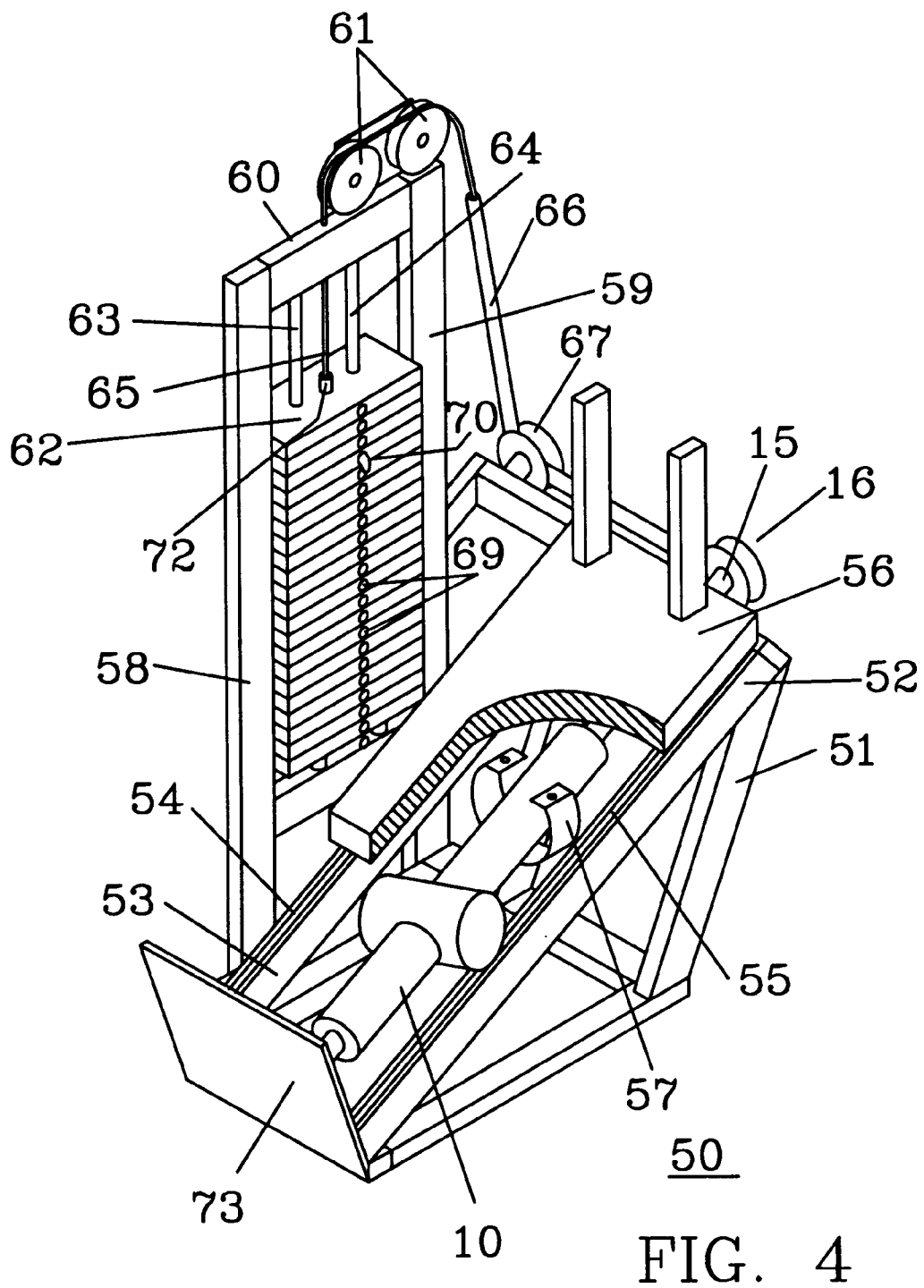
FIG. 4 shows an exercise apparatus using the sliding sleeve inclimetric resistance device of FIG. 3.

FIG. 4 shows an exercise apparatus 50 which utilizes a sliding sleeve inclimetric resistance exercise device 10. Apparatus 50 has a frame 51 that support two incline supports 52 and 53, which have sliding tracks 54 and 55, respectively. Seat 56 is mounted on sliding tracks 54 and 55 so that seat 56 will slide up and down incline supports 52 and 53. Sliding sleeve inclimetric resistance exercise device 10 is secured to the bottom of seat 56 by at least one bracket 57.

Secured to one side of apparatus 10 is a set of weights 62 that are supported in a frame made up of rails 58, 59 and 60. A pair of pulleys 61 are mounted on rail 60. A cable 65 is attached to a rod 72 that extends into weights 62. Each weight has an opening 69 extending through the weight into the support rod 72 extending through the weights. A pin 70 is inserted into an opening 68 to select the amount of weight attached to cable 65. Cable 65 is attached to a belt 66 which extends under pulley 67 and around pulley 16, on the end of sliding sleeve inclimetric resistance exercise device 10.

To use the exercise apparatus 50, a person may sit or recline in seat 56 and place his feet on bracket 73. My moving seat 56 back and forth on tracks 54 and 55, sliding sleeve inclimetric resistance exercise device 10 moves in a linear motion with the seat. This linear motion causes rollers 32, 35, 42 and 45 to move along rods 11 and 12 (see FIG. 3), which in turn causes shafts 15 and 17 to rotate, rotating pulley 16. When pulley 16 rotates, belt 66 will wind and unwind about pulley 16 moving weights 62 up and down. A resistance force which is more than the weight of the weights is experienced since rods 11 and 12 are coiled with a increasing incline.

Figure 5:
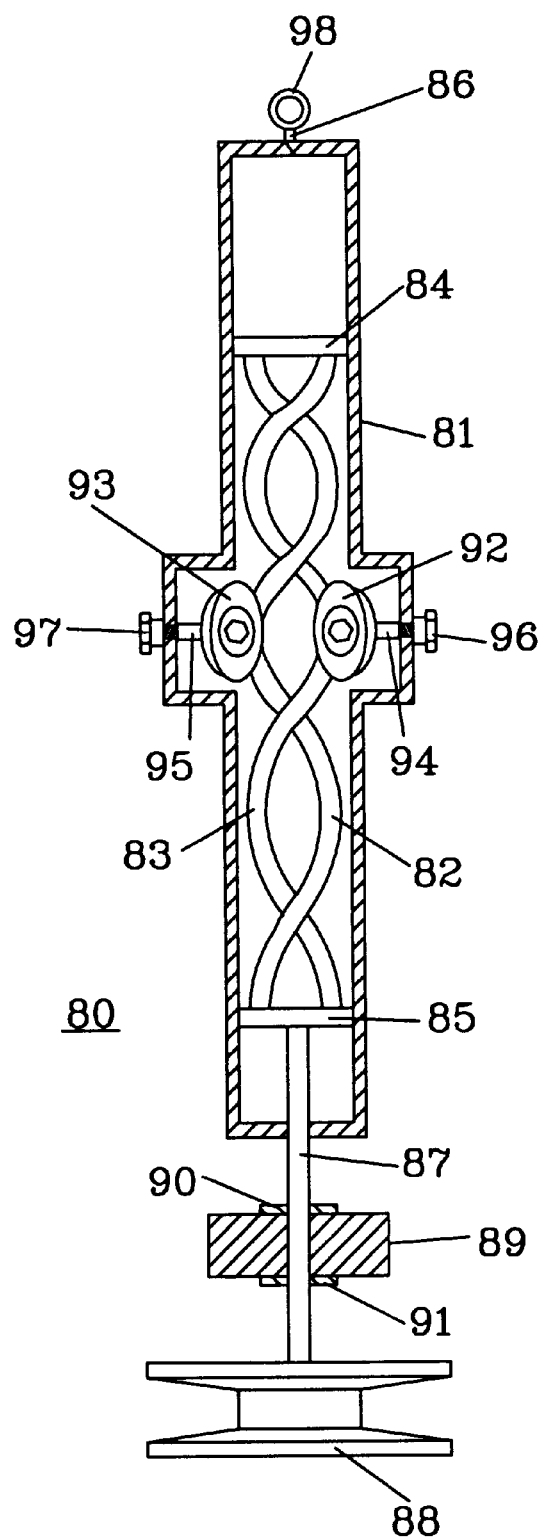
FIG. 5 shows a second embodiment of the sliding sleeve inclimetric resistance device where a rotational motion causes a linear motion of the sliding sleeve.

FIG. 5 shows a second embodiment of a sliding sleeve inclimetric resistance exercise device 80. Device 80 has a housing 81 which encloses a pair of coiled rods 82 and 83 which are coiled with changing incline from one end to the other. Coiled rods 82 and 83 are attached to disk 84 and 85 at opposite ends. Shaft 87 is attached to disk 85. A pair of rollers 92 is mounted on rod 83 and is secured to housing 81 by bracket 94 and nut 96. Similarly, a second pair of rollers 93 is mounted on rod 82 and is secured to housing 81 by bracket 95 and nut 97. Shaft 87 has a pulley 88 secured on one end. Shaft 87 is shown extending through a bracket 89 and held in place by washers 90 and 91 which are secured to shaft 87. An eyelet 98 is secured to housing 81 using threaded bolt 86. When pulley 88 is rotated in a first direction and then a second direction, housing 81 will move up and down. This is an opposite operation from the embodiment of FIG. 3 in which a back and forth linear movement of the housing causes pulley 16 to rotate. The change in resistance is opposite that from FIG. 1. The resistance of the pulley 88 is increased as the slope of the rods 127 and 128 increases in relation to the longitudinal axis (along rod 129).

Figure 6:
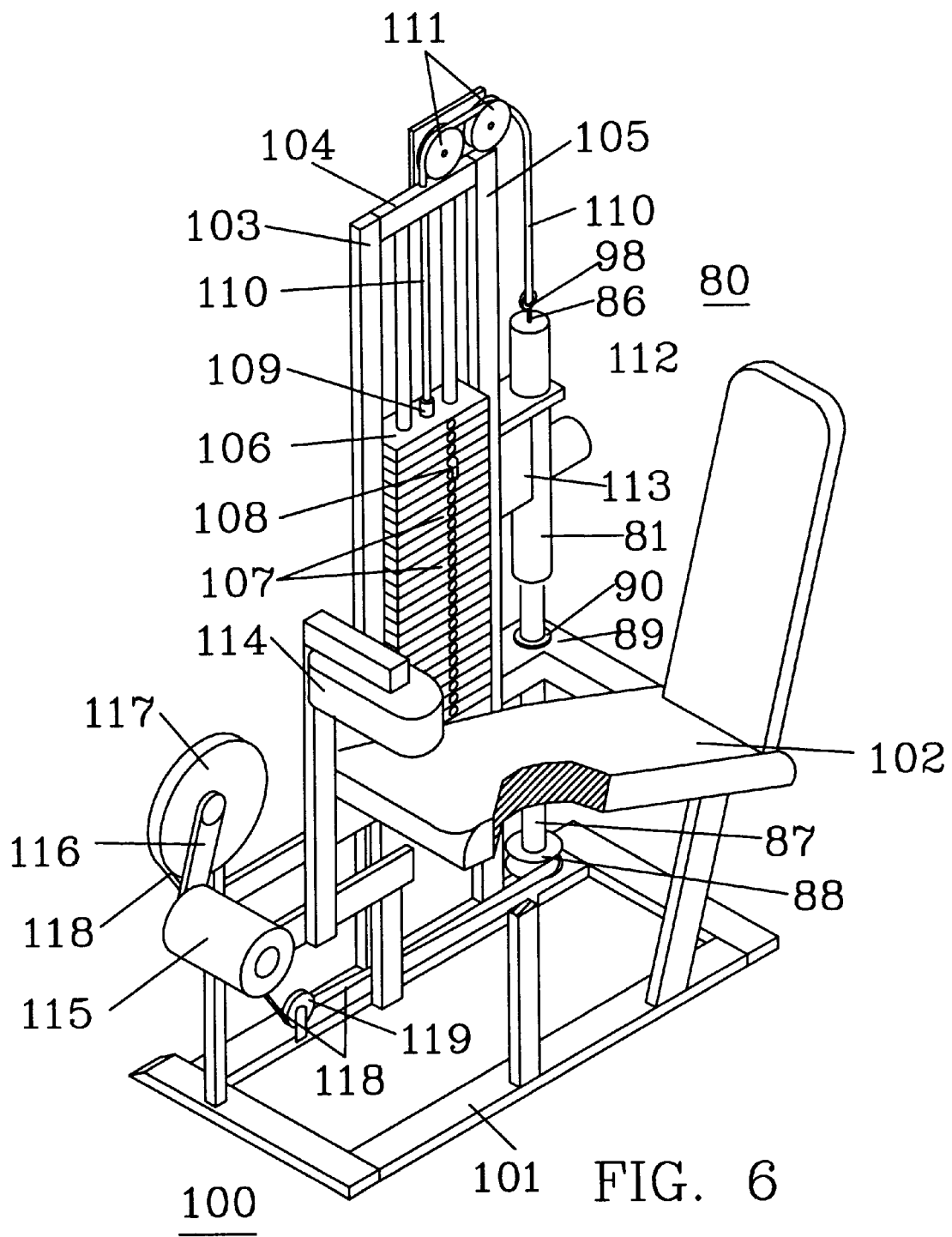
FIG. 6 shows an exercise apparatus using the sliding sleeve inclimetric resistance device of FIG. 5.

FIG. 6 shows an exercise apparatus 100 that utilizes the sliding sleeve inclimetric resistance exercise device 80 of FIG. 6. Apparatus 100 has a base frame 101 which supports a seat 102 and a weight frame 103,104 and 105 on which is mounted a plurality of weights 106. Each weight 106 has an opening 107 extending to a vertical rod 109. By inserting a key 108 into one of the openings 107, a desired number of weights 106 are attached to rod 109. A cable 110 extends from the end of rod 109, over two pulley wheels 111 and is attached to an eyelet 98 on the end of shaft 86 of device 80.

A person using exercise apparatus 100 sits on seat 102 and places a leg under roll pad 115. When roll pad 115 is lifted upward, crank lever 116 rotates pulley 117, rolling belt 118 round pulley 117. Belt 118 extends from pulley 117 around pulley 119 and turns pulley 88. When pulley 88 is rotated shaft 87 extending through support 89 turns the coiled rod 82,83 and disks 84,85 in device 80 causing housing 81 to move up or down depending upon the direction of motion of roll pad 115. Brackets 112 and 113 controls the movement of housing 81 allowing it to move up and down, but not rotate. Cable 110, attached to housing 81, moves weights 106 up and down. A person exercising may also lean over pad 114 and lift roll pad 115 up and down by hand.

Figure 7:
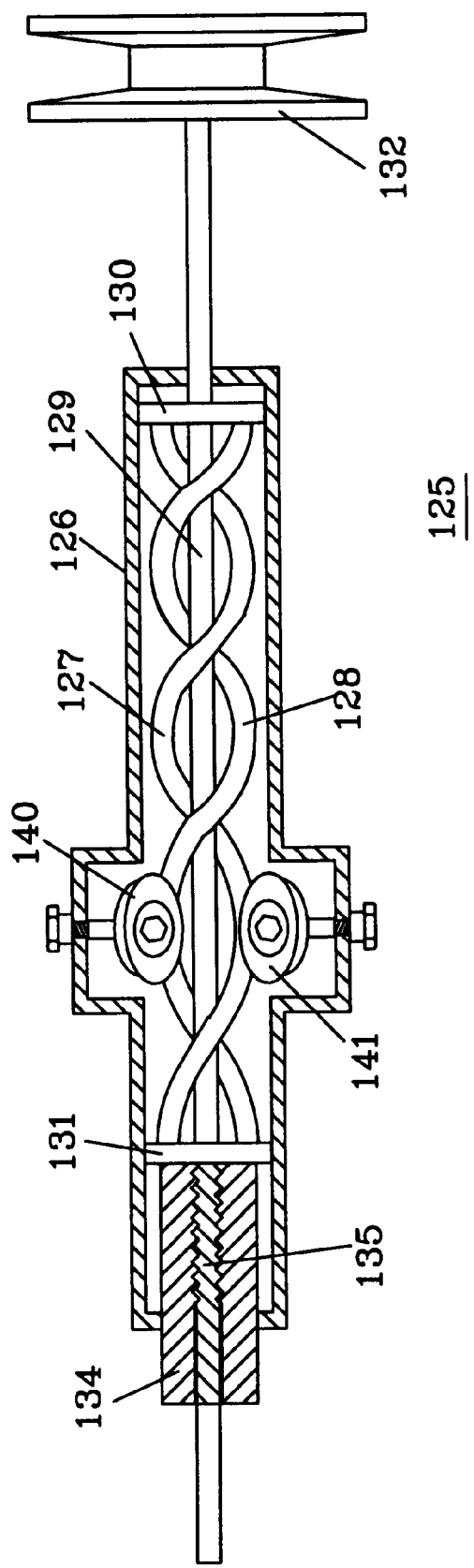
FIG. 7 shown an example of the sliding sleeve inclimetric resistance device in which the incline of the rods can be adjusted.

FIG. 7 shows an embodiment of a sliding sleeve inclimetric resistance exercise device 125 on which the incline or slope of coiled rods 127 and 128 may be changed. Coiled rods 127 and 128 are attached to disks 130 and 131. Shaft 129 is secured to disk 130, both of which are free to rotate, but passes through and is not attached to disk 131. Disk 131 is free to rotate in device 125. Rod 129 is threaded at 135 and has a nut 134 with matching threads. When nut 135 is screwed on threads 135 toward disk 131, rods 127 and 128 will be compressed, causing them to flex outward, changing the slope of the incline of each of rods 127 and 128. This change in slope adjusts the incline resistance of sliding sleeve inclimetric resistance exercise device 125. In this way the inclimetric resistance is changed. Moving of housing 126 and roller pairs 140 and 141 will cause pulley 132 and shaft 129 to rotate.

What is claimed:

1. A sliding sleeve inclimetric resistance exercise device, comprising:
    a housing;
    a pair of coiled rods, attached to disks at first and second ends, having an increasing slope from the first end to the second end;
    first and second wheel sets, each wheel set secured to said housing, said first wheel set engaging one of said coiled rods and said second wheel set engaging the other of said coiled rods;
    a shaft attached to at least one of said disk and extending out of said housing; and
    a pulley mounted on said shaft;
    wherein when said housing is moved in a direction parallel to said pair of coiled rods, said first and second wheel sets cause said coiled rods, shaft and pulley to rotate, and when said pulley is rotated, said housing moves in a direction parallel to said coiled rods.

2. The sliding sleeve inclimetric resistance exercise device according to claim 1, wherein each of said wheel sets includes two wheels, each wheel having a concave outer surface which engages a coiled rod.

3. The sliding sleeve inclimetric resistance exercise device according to claim 2, where in the wheels of a wheel set are mounted on a support, each wheel having a rotation axis rotated 90 degrees from the other wheel.

4. The sliding sleeve inclimetric resistance exercise device according to claim 2, wherein said concave surfaces of said wheels partially enclose the rod which they engage.

5. The sliding sleeve inclimetric resistance exercise device according to claim 1, including a shaft attached to each of said disks.

6. The sliding sleeve inclimetric resistance exercise device according to claim 1 in combination with an exercise machine having a set of stacked weights, said sliding sleeve inclimetric resistance exercise device connected to said weights to provide a combination of the weights and inclimetric resistance.

7. A sliding sleeve inclimetric resistance exercise device, comprising:

a housing;

a pair of coiled rods attached to each other at first and second ends and having an increasing slope from a first end to a second end;

first and second wheel sets, each wheel set secured to said housing, said first wheel set engaging and partially enclosing one of said coiled rods and said second wheel set engaging and partially enclosing the other of said coiled rods;

a shaft secured to one end of said pair of coiled rods; and a pulley mounted on said shaft;

wherein when said pulley is rotated, said housing moves in a direction parallel to said coiled rods.

8. The sliding sleeve inclimetric resistance exercise device according to claim 7, wherein each of said wheel sets includes two wheels, each wheel having a concave outer surface which engages a coiled rod.

9. The sliding sleeve inclimetric resistance exercise device according to claim 8, where in the wheels of a wheel set are mounted on a support, each wheel having a rotation axis rotated 90 degrees from the other wheel.

10. The sliding sleeve inclimetric resistance exercise device according to claim 8, wherein said concave surfaces of said wheels partially enclose the rod which they engage.

11. The sliding sleeve inclimetric resistance exercise device according to claim 7, including a shaft attached to each of said disks.

12. The sliding sleeve inclimetric resistance exercise device according to claim 7 in combination with an exercise machine having a set of stacked weights, said sliding sleeve inclimetric resistance exercise device connected to said weights to provide a combination of the weights and inclimetric resistance.

13. A sliding sleeve inclimetric resistance exercise device, comprising:

a housing;

a pair of coiled rods, attached to disks at first and second ends, having an increasing slope from the first end to the second end;

first and second wheel sets, each wheel set secured to said housing, said first wheel set engaging one of said coiled rods and said second wheel set engaging the other of said coiled rods;

a shaft attached to at least one of said disk and extending out of said housing; and a pulley mounted on said shaft;

an adjustment device mounted on said shaft for applying pressure to a disk attached to one end of the pair of coiled rods to adjust the slope of incline of the coiled rods;

wherein when said housing is moved in a direction parallel to said pair of coiled rods, said first and second wheel sets cause said coiled rods, shaft and pulley to rotate, and when said pulley is rotated, said housing moves in a direction parallel to said coiled rods.

* * * * *